(12) United States Patent
Payne, III et al.

(10) Patent No.: US 9,621,736 B2
(45) Date of Patent: Apr. 11, 2017

(54) METHOD AND SYSTEM FOR SPONSORING LOCATION BASED MOBILE DATA SERVICES

(71) Applicant: BroadView Communications, LLC, Schaumburg, IL (US)

(72) Inventors: William Andrew Payne, III, Glen Ellyn, IL (US); Andrew Chu, St. Charles, IL (US); Irfan Ali, Istanbul (TR)

(73) Assignee: BroadView Communications, LLC, Schaumburg, IL (US)

( * ) Notice: Subject to any disclaimer, the term of this patent is extended or adjusted under 35 U.S.C. 154(b) by 0 days.

(21) Appl. No.: 15/050,746

(22) Filed: Feb. 23, 2016

(65) Prior Publication Data

US 2016/0248916 A1 Aug. 25, 2016

Related U.S. Application Data

(60) Provisional application No. 62/119,927, filed on Feb. 24, 2015, provisional application No. 62/254,333, filed on Nov. 12, 2015.

(51) Int. Cl.
*H04W 4/24* (2009.01)
*H04M 15/00* (2006.01)
(Continued)

(52) U.S. Cl.
CPC ......... *H04M 15/725* (2013.01); *H04M 15/61* (2013.01); *H04W 4/025* (2013.01);
(Continued)

(58) Field of Classification Search
None
See application file for complete search history.

(56) References Cited

U.S. PATENT DOCUMENTS

2005/0043060 A1* 2/2005 Brandenberg ............ G01S 5/02
455/558
2010/0107225 A1* 4/2010 Spencer .............. H04L 63/0876
726/4

(Continued)

*Primary Examiner* — Diane Mizrahi
(74) *Attorney, Agent, or Firm* — Garlick & Markison; Timothy W. Markison

(57) ABSTRACT

A method includes determining that a mobile computing device is within an enterprise geographic location. The method further includes, when the mobile computing device is within the enterprise geographic location, determining that a user of the mobile computing device is eligible for an enterprise sponsored mobile data service. The method further includes, when the user of the mobile computing device is eligible, determining use parameters for the enterprise sponsored mobile data service. The method further includes registering the mobile computing device for the enterprise sponsored mobile data service with an enterprise server and/or a mobile data service provider. The method further includes the mobile computing device receiving the enterprise sponsored mobile data services in accordance with the use parameters. The method further includes adjusting, by the mobile data service provider, billing rate of the mobile computing device while receiving the enterprise sponsored mobile data service.

20 Claims, 9 Drawing Sheets

(51) Int. Cl.
*H04W 4/02* (2009.01)
*H04W 4/12* (2009.01)
*H04W 12/08* (2009.01)

(52) U.S. Cl.
CPC ............... *H04W 4/12* (2013.01); *H04W 4/24* (2013.01); *H04W 12/08* (2013.01)

(56) References Cited

U.S. PATENT DOCUMENTS

2013/0167196 A1* 6/2013 Spencer .................. H04W 8/22
 726/3
2013/0285855 A1* 10/2013 Dupray .................. G01S 19/48
 342/451

* cited by examiner system 10

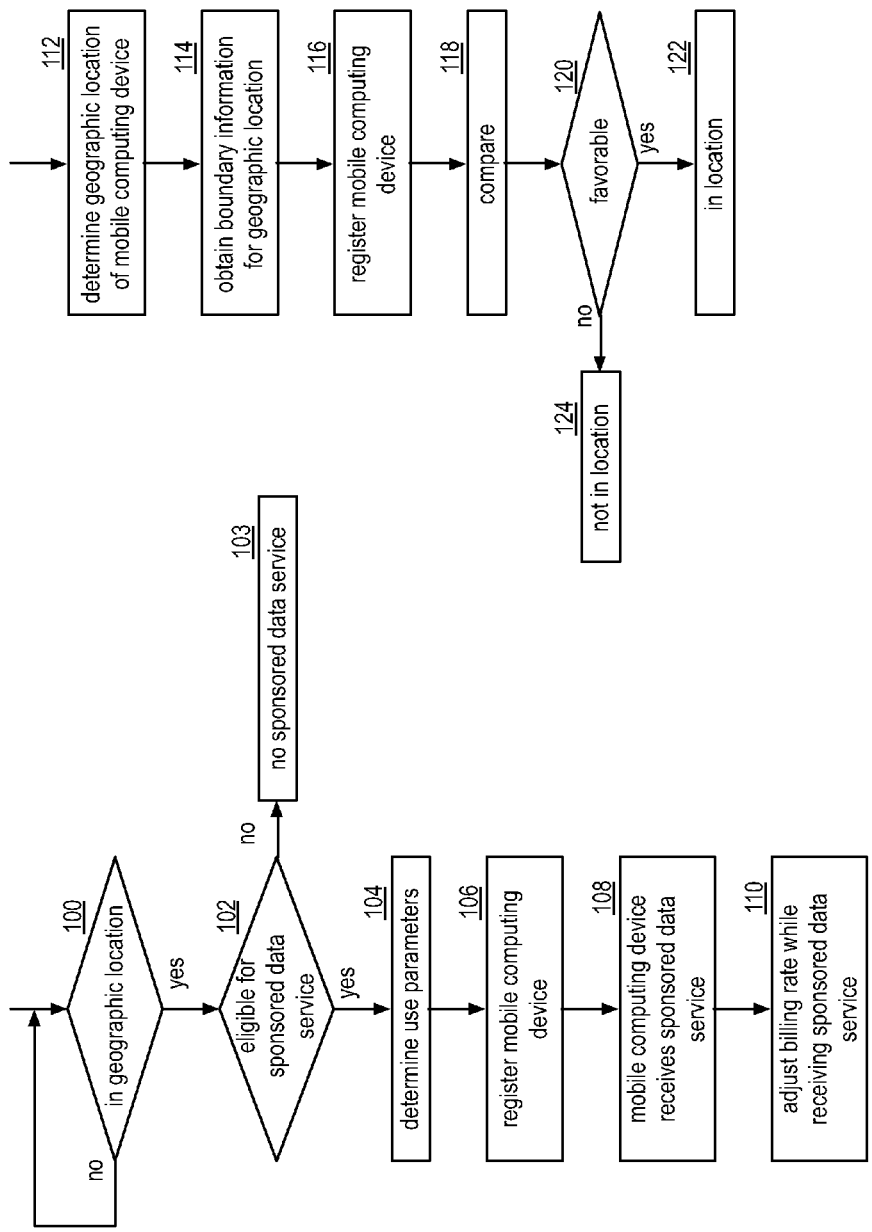

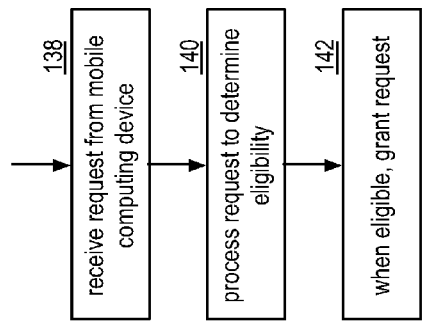
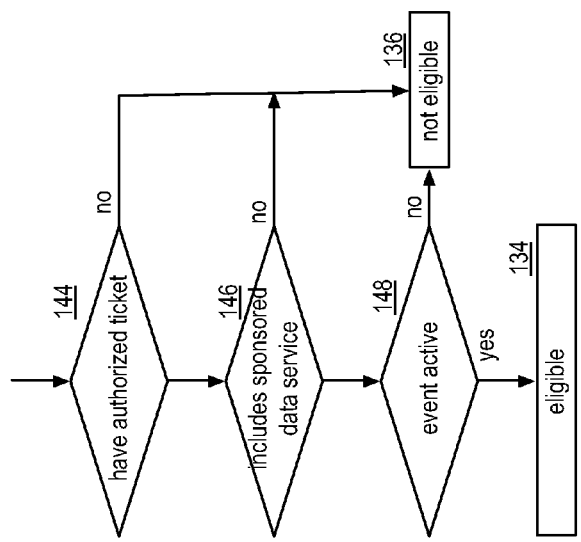
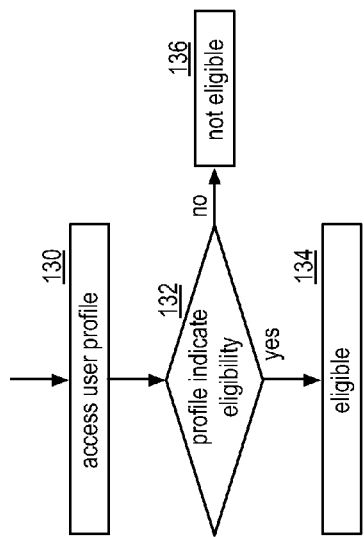
FIG. 6A
FIG. 6B
FIG. 6C

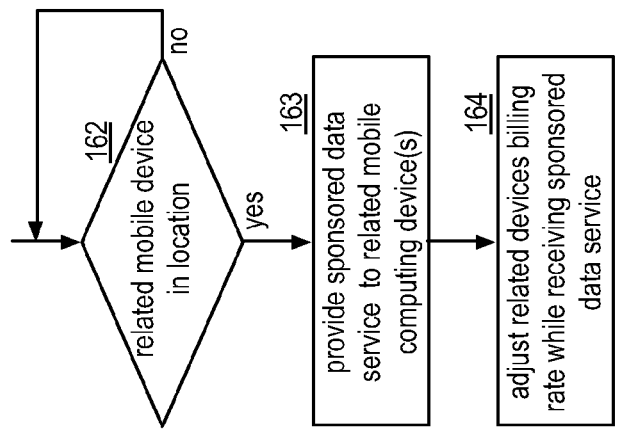
FIG. 9
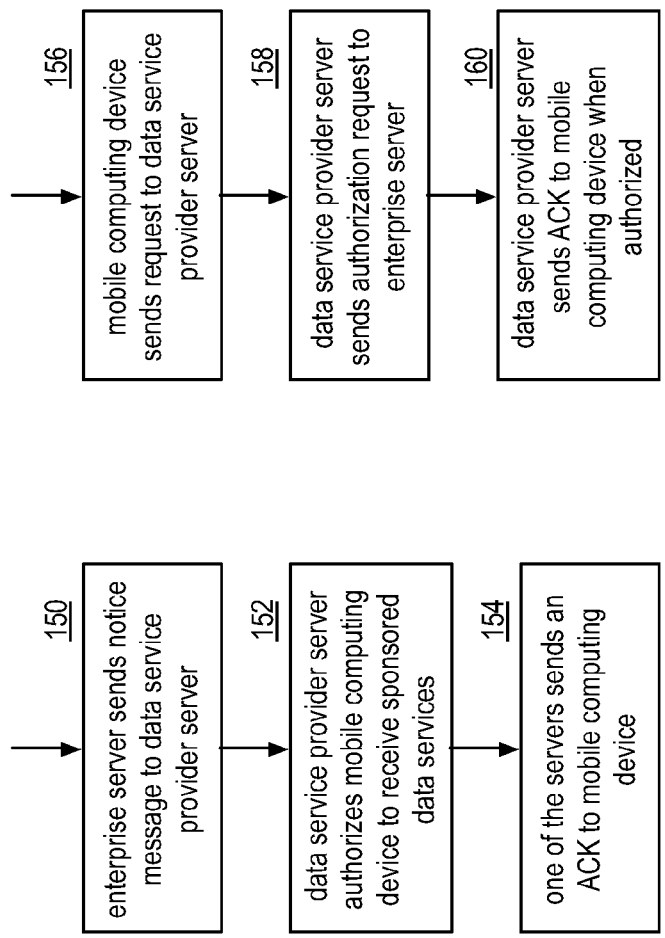
FIG. 8
FIG. 7

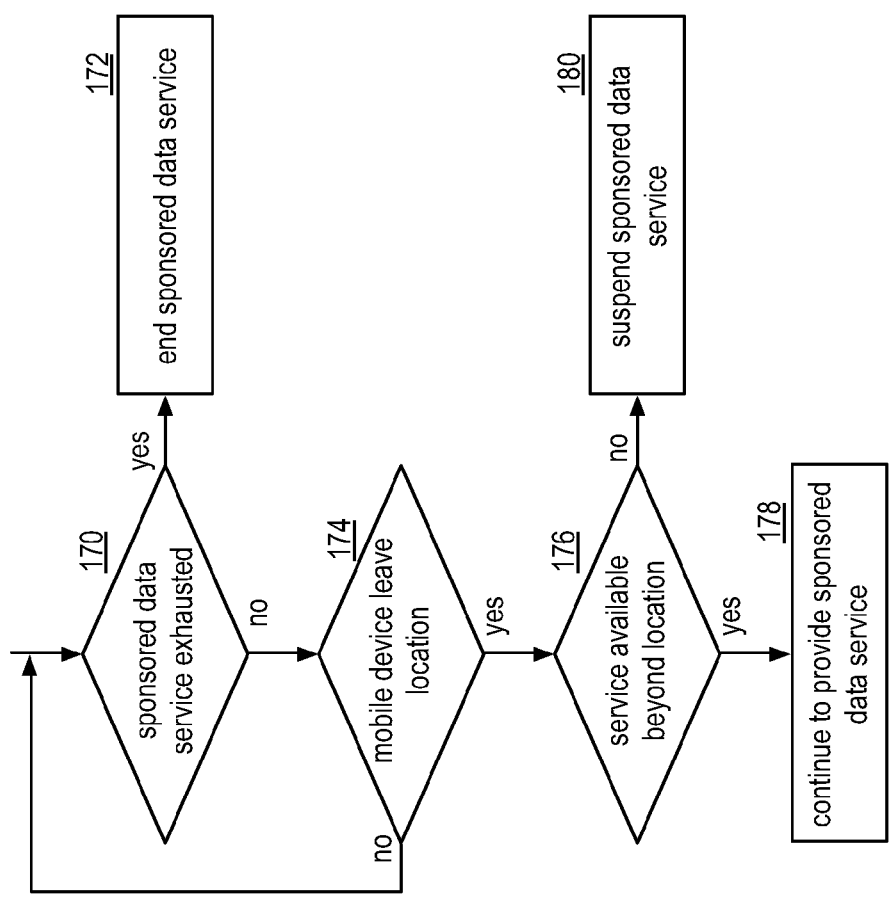

METHOD AND SYSTEM FOR SPONSORING LOCATION BASED MOBILE DATA SERVICES

CROSS REFERENCE TO RELATED PATENTS

The present U.S. Utility Patent Application claims priority pursuant to 35 U.S.C. §119(e) to U.S. Provisional Application No. 62/119,927, entitled "SYSTEM AND APPLICATIONS FOR THE IMPLEMENTATION OF LOCATION BASED SPONSORED DATA SERVICES FOR MOBILE AND FIXED NETWORKS", filed Feb. 24, 2015, which is hereby incorporated herein by reference in its entirety and made part of the present U.S. Utility Patent Application for all purposes. The present U.S. Utility Patent Application claims priority pursuant to 35 U.S.C. §119(e) to U.S. Provisional Application No. 62/254,333, entitled "SUBSCRIBER CONTROLLED APPLICATION AND SPONSORED DATA TRAFFIC MANAGEMENT IN MOBILE AND FIXED NETWORKS", filed Nov. 12, 2015.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates general to wireless communication systems and more particularly to sponsoring mobile data services in various communication systems.

Description of Related Art

Over The Top applications such as social media services, streaming audio and/or video services, and downloading audio and/or video services consume a substantial amount of data bandwidth. Mobile data service providers (e.g., cellular data service providers) support the Over The Top applications within their network and, for the most part, the applications are transported transparently. The mobile data service providers support the Over The Top applications without specific billing. As such, a mobile device's data plan typically includes a set amount of data consumption per month for a monthly fee regardless of the type of data is being consumed. The data plan further includes an overage fee that applies when the set amount of data consumption in a month is exceeded.

Recently, some entities sponsor mobile devices (e.g., cell phones, tablets, laptop with cellular data service, etc.) to download specific sponsored data content from their websites. Regardless of the location of the mobile device, as it downloads the sponsored data content from the site, the data consumption is not counted towards the mobile device's monthly plan. The sponsoring entity sponsors and pays for the data transfer.

Other services for the mobile devices include proximity based searches, alerts, and/or advertising. For example, when a mobile device is requested to perform a search for nearby coffee shops, the position of the mobile device is determined and a search is conducted for coffee shops within a given distance from the current location of the mobile device.

BRIEF DESCRIPTION OF THE SEVERAL VIEWS OF THE DRAWING(S)

FIG. 4 is a logic diagram of an example of a method for sponsoring mobile data services in accordance with the present invention;

FIG. 5 is a logic diagram of an example of a method for determining location as part of sponsoring mobile data services in accordance with the present invention;

FIGS. 6A-6C are each a logic diagram of example of a method for determining eligibility of receiving sponsored mobile data services in accordance with the present invention;

FIG. 7 is a logic diagram of an example of a method in furtherance of sponsoring mobile data services in accordance with the present invention;

FIG. 8 is a logic diagram of another example of a method in furtherance of sponsoring mobile data services in accordance with the present invention;

FIG. 9 is a logic diagram of another example of a method in furtherance of sponsoring mobile data services in accordance with the present invention;

FIG. 10 is a logic diagram of another example of a method in furtherance of sponsoring mobile data services in accordance with the present invention;

DETAILED DESCRIPTION OF THE INVENTION

Figure 1:
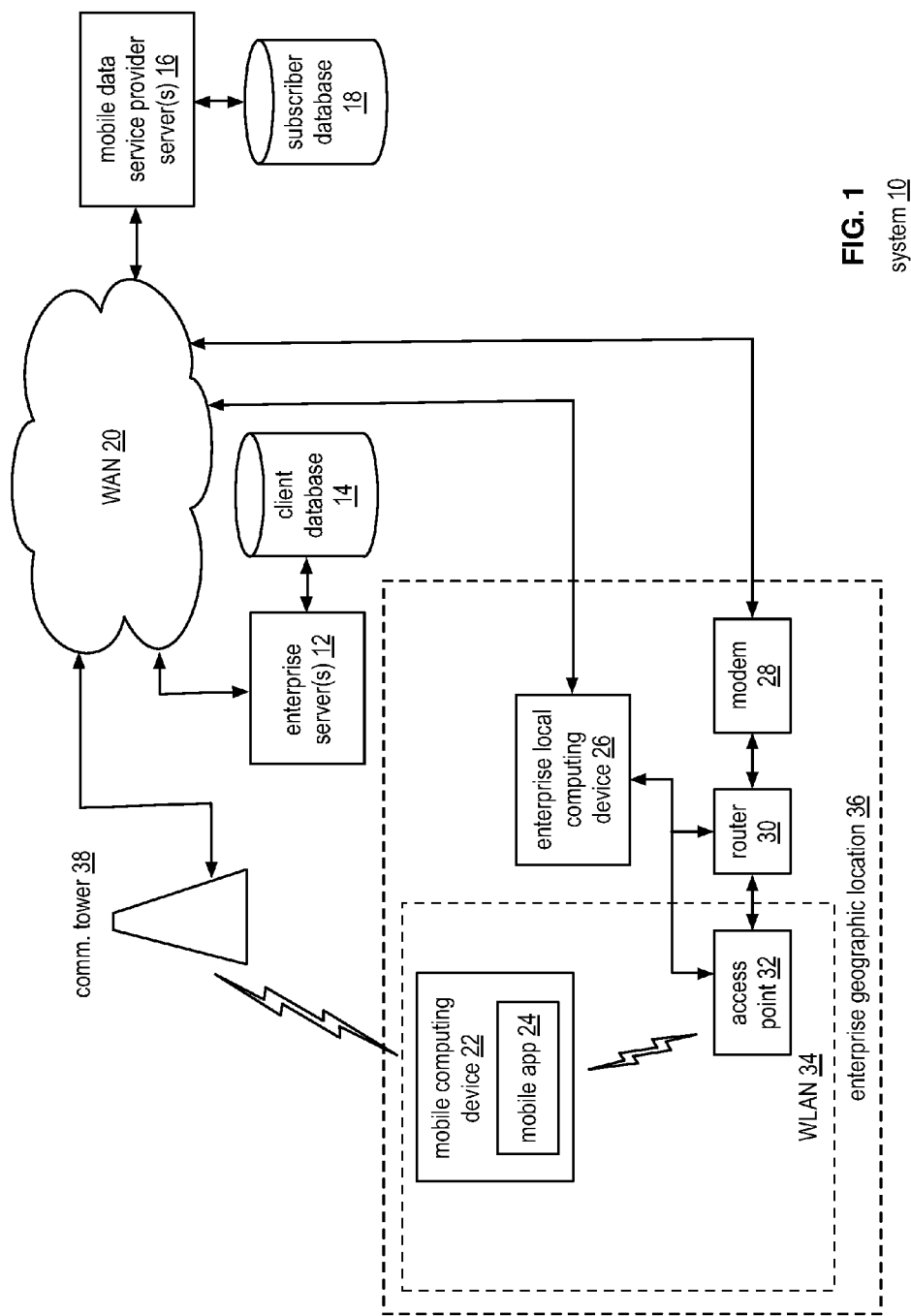
FIG. 1 is a schematic block diagram of an embodiment of communication system that supports sponsoring of mobile data services in accordance with the present invention.

FIG. 1 is a schematic block diagram of an embodiment of communication system 10 that supports location based sponsored mobile data services. The system 10 includes one or more enterprise servers 12, an enterprise client database 14, one or more mobile data service provider servers 16, a subscriber database 18, a mobile computing device 22 (which includes a mobile application 24 regarding location based sponsored mobile data services), an enterprise local computing device 26, a modem 28, a router 30, an access point 32, and/or a mobile data communication tower 38. The servers 12 & 16 and the communication tower 38 are coupled to a wide area network (WAN) 20, which includes one or more of the Internet, a mobile data access network, and any other type of communication network.

Figure 3:
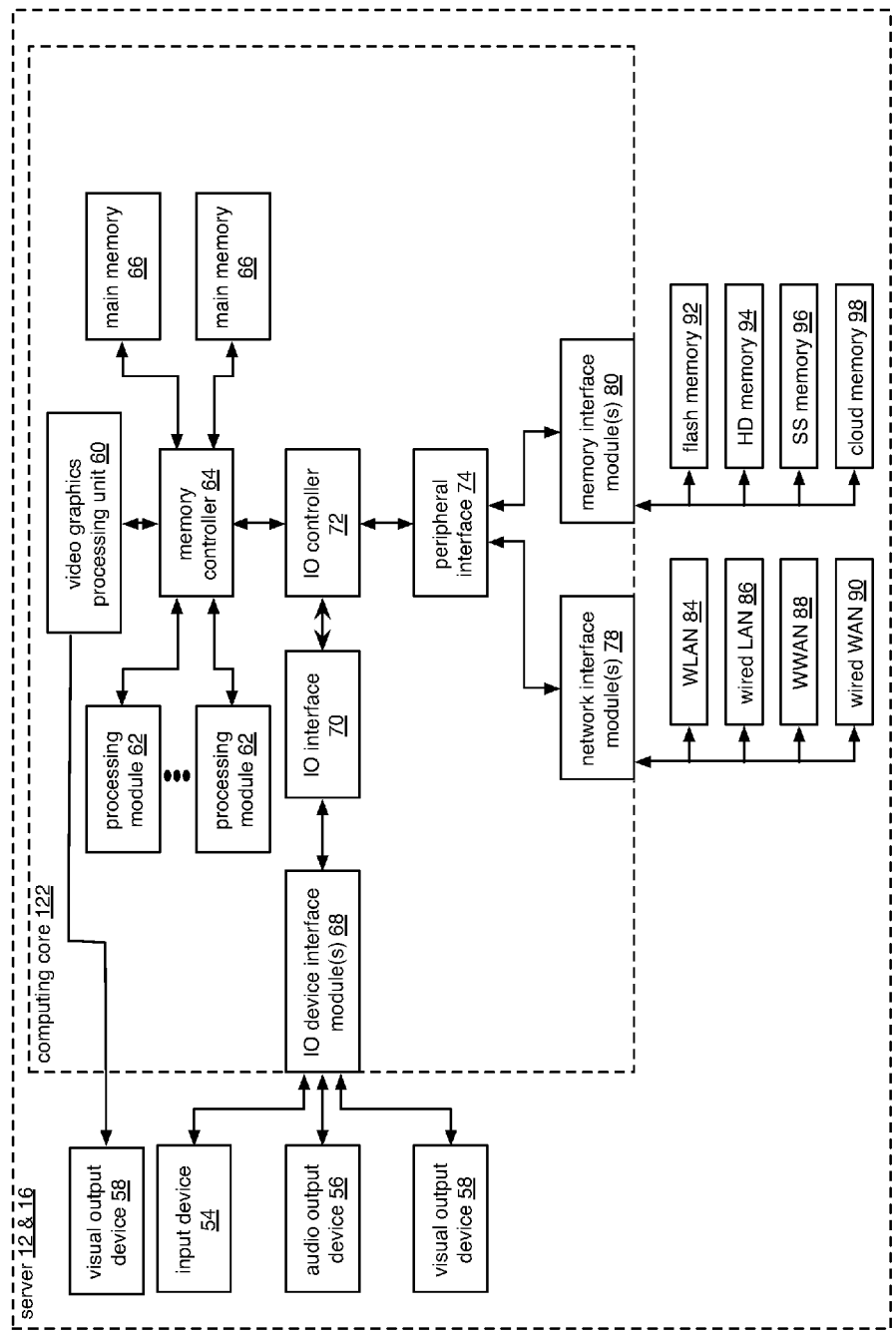
FIG. 3 is a schematic block diagram of an embodiment of a server in accordance with the present invention.

An enterprise operates the enterprise server(s) 12, the enterprise client database 14, and the enterprise local computing device 26. The enterprise may be a retail business, a service business (e.g., auto repair), a food service business (e.g., a restaurant), a specialty service business (e.g., a coffee shop), an event hosting business (e.g., an arena that hosts sporting events, concerts, conventions, etc.), entertainment facilities (e.g., amusement park, zoo, municipal park, etc.), hotels, etc. The enterprise may have a single location or a plurality of locations. Further, for smaller enterprises, the enterprise server(s) 12 and the enterprise local computing device 26 may be one or more common computing devices. Example embodiments of the enterprise server 12 and of the enterprise local computing device 26 are shown in FIG. 3.

The enterprise further operates the client database 14, which stores information regarding clients of the enterprise. For example, if the enterprise is a hotel, the client information includes client name, client address, client billing information, cell phone number, hotel award program status, etc. As another example, if the enterprise is an arena, the client information includes client name, level of access to an event (e.g., seats for a concert; credentials for a convention, etc.), client event attendance history, etc.

The enterprise may further operate a wireless local area network (WLAN) 34 on its premises. The enterprise offers WLAN connectivity to its clients as a complimentary service and/or for a fee. The WLAN 34 allows users to connect to the WAN 20 via the access point 32, the router 30, and the modem 28.

A mobile data service provider operates the mobile data service provider server(s) 16 and provides mobile data services to its subscribers. The mobile data service provider may be a cellular data service provider, a Wi-Fi (e.g., wireless local area network) service provider, a cellular voice service provider, and/or a streaming data service provider. As such, the mobile data services may be cellular data services, cellular voice services, streaming data services, etc. An example embodiment of the mobile data service provider server 16 is shown in FIG. 3.

The mobile data service provider further operates the subscriber database 18. The subscriber database 18 stores information regarding subscribers (e.g., users of a mobile computing device) of the mobile data service provider. For example, the information includes subscriber personal information (e.g., name, address, etc.), information regarding the mobile computing device (e.g., serial number, phone number, model, etc.), subscription plan (e.g., individual plan, amount of data, group plan, etc.), and billing rates for the subscription plan.

A user (e.g., a client of the enterprise and a subscriber of the mobile data service provider) operates the mobile computing device 22. The mobile computing device 22 may be a cellular telephone, a computer tablet, a laptop computer with a mobile data network card (or the like), and/or any other device that includes a computing core and a mobile data network card, or the like. An embodiment of a mobile computing device 22 is shown in FIG. 2.

In an example of operation, a user of the mobile computing device 22 enters the premises of the enterprise (e.g., the user enters a hotel, a sports stadium, the zoo, etc.). Upon entering the premises, the user, via its mobile computing device 22, may be eligible to receive sponsored mobile data services. For example, the enterprise sponsors cellular data services for select clients (e.g., clients that meet a particular set of requirements) when the client's mobile computing device is within the geographic location 36 of the enterprise (e.g., the premises of the enterprise).

For a select client, the enterprise registers the client's mobile computing device 22 in its client database 14 as being eligible for the sponsored mobile data service. In addition, the enterprise server 12 and the mobile data service provider server 16 communicate to establish that the enterprise is sponsoring the mobile computing device's use of the mobile data service and the terms thereof (e.g., client receives for free or at a reduced rate, the amount of data consumption being sponsored, a time frame, etc.). Once set up, the mobile computing device 22 receives the sponsored mobile data services until one or more conditions for ending the reception of the sponsored mobile data services are met. For example, mobile computing device 22 receives the sponsored mobile data service until a particular event (e.g., a trade show, a sporting event, a concert, etc.) ends, until the mobile computing leaves the enterprise geographic location 36, and/or until the mobile computing device 22 consumes more data than a sponsored data threshold.

Figure 2:
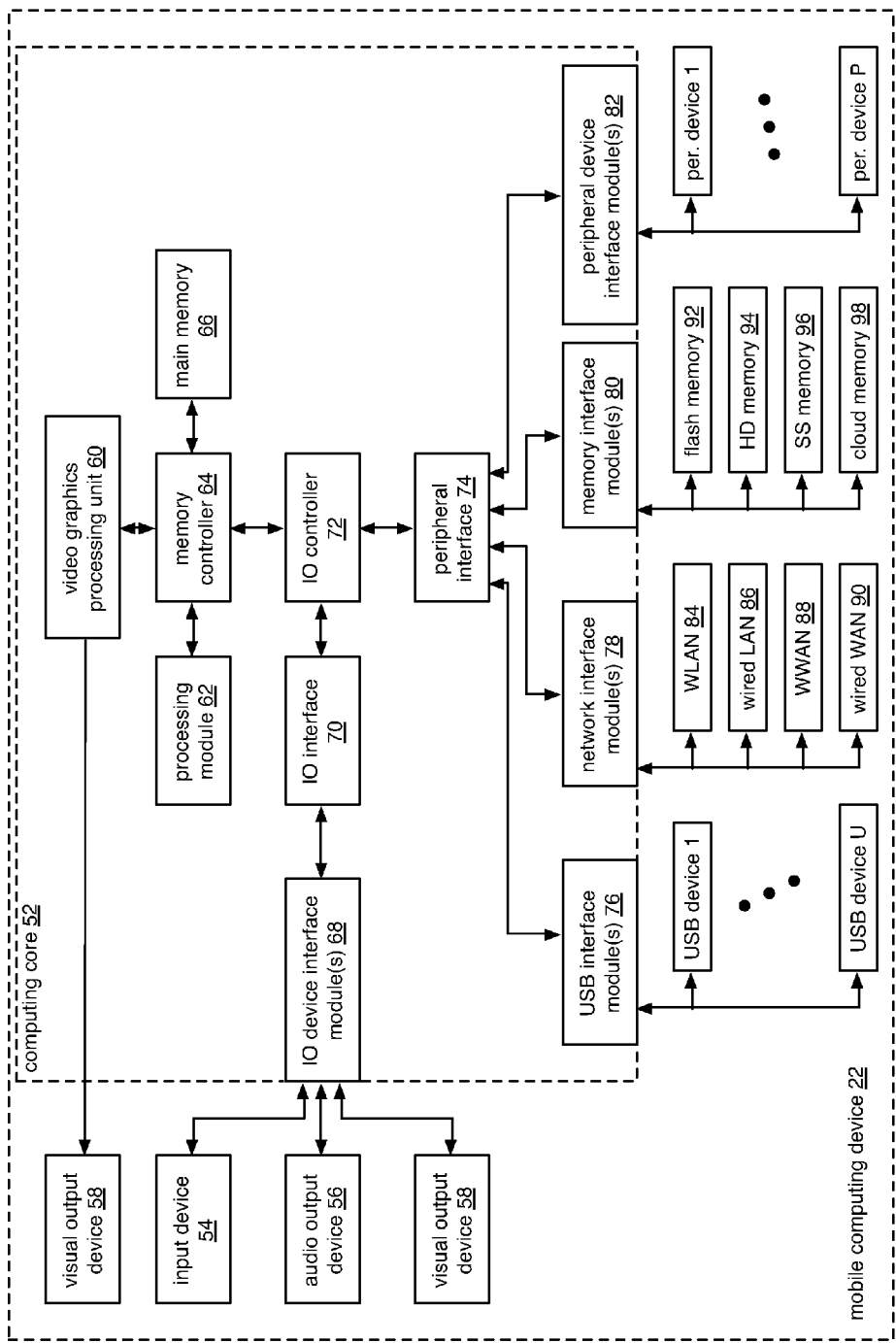
FIG. 2 is a schematic block diagram of an embodiment of a mobile computing device in accordance with the present invention.

FIG. 2 is a schematic block diagram of an embodiment of mobile computing device 12-14. The computing device 12-14 includes a computing core 52, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more universal serial bus (USB) devices, one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices.

The computing core 52 includes a video graphics processing unit 60, one or more processing modules 62, a memory controller 64, main memory 66 (e.g., RAM), one or more input/output (I/O) device interface modules 68, an input/output (I/O) interface 70, an input/output (I/O) controller 72, a peripheral interface 74, one or more USB interface modules 76, one or more network interface modules 78, one or more memory interface modules 80, and/or one or more peripheral device interface modules 82. Each of the interface modules 68, 76, 78, 80, and 82 includes a combination of hardware (e.g., connectors, wiring, etc.) and operational instructions stored on memory (e.g., driver software) that is executed by the processing module 62 and/or a processing circuit within the interface module. Each of the interface modules couples to one or more components of the computing device 12-16. For example, one of the IO device interface modules 68 couples to an audio output device 56. As another example, one of the memory interface modules 80 couples to flash memory 92 and another one of the memory interface modules 80 couples to cloud memory 98 (e.g., an on-line storage system and/or on-line backup system).

FIG. 3 is a schematic block diagram of an embodiment of a server 18, 26-34 that includes a computing core 122, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices. Note that the server 18 may include more or less devices than shown in this example embodiment of a server.

The computing core 122 includes a video graphics processing unit 60, a plurality of processing modules 62, a memory controller 64, a plurality of main memories 66 (e.g., RAM), one or more input/output (I/O) device interface module 68, an input/output (I/O) interface 70, an input/output (I/O) controller 72, a peripheral interface 74, one or more network interface modules 78, and/or one or more memory interface module 80.

FIG. 4 is a logic diagram of an example of a method for sponsoring mobile data services that begins at step 100. At step 100, the enterprise server determines whether the mobile computing device 22 is within an enterprise geographic location 36. FIG. 5 illustrates an example embodiment of determining whether the mobile computing device is within an enterprise geographic location.

When the mobile computing device is within the enterprise geographic location, the method continues at step 102 where the enterprise server determines whether the user of the mobile computing device is eligible for one or more enterprise sponsored mobile data services (e.g., cellular data service, cellular voice data service, streaming download service, etc.). FIGS. 6A-6C illustrate example embodiments of determining whether the user is eligible for the sponsored mobile data service. If the user is not eligible, the method continues at step 103 where the enterprise server records that the mobile computing device is not eligible.

If the user is eligible, the method continues at step 104 where the enterprise server determines the use parameters for the mobile computing device receiving the one or more sponsored mobile data services. The enterprise server determines the use parameters based on user profile data, type of sponsorship, type of sponsored mobile data service, and/or mobile computing device data subscription.

For example, a use parameter includes the mobile computing device only receives the one or more enterprise sponsored mobile data services while it is within the enterprise geographic location. As another example, a use parameter includes the mobile computing device receives the one or more enterprise sponsored mobile data services for a specified time duration. As yet another example, a use parameter includes the mobile computing device receives the one or more enterprise sponsored mobile data services while its data consumption remains below a data consumption threshold. As yet a further example, the use parameters includes a combination of two or more of the preceding examples.

In furtherance of the use parameter examples, the user profile data includes the user of the mobile computing device being a registered guest of the enterprise, an enterprise award program to which the user of the mobile computing device has subscribed, a level of client, and/or the user of the mobile computing device being affiliated with an event occurring within the enterprise geographic location. The type of sponsorship includes an event-based sponsorship, a time based sponsorship, a location based sponsorship, a client reward based sponsorship, and/or a data consumption based sponsorship. The type of sponsored mobile data service includes unique data content at no cost, reduced rate data service, and/or zero cost data services.

The method continues at step 106 where the enterprise server and the mobile data service provider server registers the mobile computing device for the one or more enterprise sponsored mobile data services with at least one of an enterprise server and a mobile data service provider. FIGS. 6 and 7 illustrate example embodiments of registering the mobile computing device.

The method continues at step 108 where the mobile computing device receives the one or more enterprise sponsored mobile data services in accordance with the use parameters. For example, the mobile computing device receives a sponsored mobile data service for a duration of time (e.g., 30 minutes before to 30 minutes after a sporting event) and while remaining within the enterprise geographic location. As another example, one mobile computing device receives a priority level of sponsored mobile data service (e.g., a higher data consumption threshold) than another mobile computing device based on one more criteria of the associated users (e.g., a more elite reward program status, box seats v. grand stand seats, etc.).

The method continues at step 110 where the mobile data service provider server adjusts the mobile computing device's billing rate while receiving the one or more enterprise sponsored mobile data services. For example, the mobile data service provider server reduces the mobile computing device's billing rate to zero. As another example, the mobile data service provider server reduces the mobile computing device's billing rate by a percentage (e.g., 10% to 90%) of a non-sponsored billing rate. Further, the mobile data service provider tracks the mobile computing device's consumption of the sponsored mobile data service for accounting with the enterprise server.

FIG. 5 is a logic diagram of an example of a method for determining location as part of sponsoring mobile data services. The method begins at step 112 where the enterprise server determines a geographic location of the mobile computing device. For example, the mobile computing device determines its geographic location based on global positioning satellite information, Bluetooth beacon reception, other wireless communication locating service, or a data entry by the user, and provides the location to the enterprise server. As another example, the enterprise server determines the mobile computing device's location when the mobile computing device registers with the enterprise's on-location WLAN and/or data entry into the enterprise local computer.

The method continues at step 114 where the enterprise server obtains boundary information (e.g., a digital representation of longitude and latitude coordinates defining the boundary or a geographic fence) of the enterprise geographic location. For example, the enterprise server access stored information regarding the enterprise geographic location. As another example, the enterprise server determines the enterprise geographic location based on a recorded plot description. As yet another example, the enterprise server receives an input that defines the boundary information. As a further example, the enterprise server calculates the boundary information based on digital mapping information (e.g., on-line geographic maps).

The method continues at step 116 where the enterprise server registers the mobile computing device. For example, the enterprise server updates or creates a client record for the user of the mobile computing device to identify the mobile computing device (e.g., a phone number, an IP address, etc.) in its client database. The record further indicates that the mobile computing device desires to receive the sponsored mobile data service.

The method continues at step 118 where the enterprise server compares the geographic location of the mobile computing device with the boundary information (e.g., the geographic coordinates of the mobile device are within geographic coordinates of the enterprise geographic location). If the comparison is unfavorable, the method branches from step 120 to step 124 where the enterprise server indicates that the mobile computing device is not within the enterprise geographic location. If the comparison is favorable, the method branches from step 120 to step 122 where the enterprise server indicates that the mobile computing device is within the enterprise geographic location.

FIGS. 6A-6C are each a logic diagram of example of a method for determining eligibility of receiving sponsored mobile data services. In FIG. 6A, the method starts at step 130 where the enterprise server and/or the mobile data service provider server accesses a user profile data of the user associated with the mobile computing device. The user profile data is stored in the client database and/or the subscriber database and includes information such as client information (name, address, award program status, etc.), mobile computing device information (e.g., device ID, phone number, IP address, etc.), and sponsored mobile service data eligibility information (e.g., registered guest, ticket owner, trade show attendee, trade show presenter, etc.).

The method continues at step 132 where the enterprise server and/or the mobile data service provider server determine whether the user profile indicates eligibility. For example, the client information is for a valid client, the mobile computing device information is for a valid mobile computing device, and the sponsored mobile service data eligibility information indicates that this user and its associated mobile computing device is eligible for the sponsored mobile data service. If yes, the method continues at step 134 where the enterprise server and/or the mobile data service provider server indicate that the mobile computing device is eligible and to step 136 when the mobile computing device is not eligible.

The method of FIG. 6B begins at step 138 where the enterprise server and/or the mobile data service provider server receive a request from the mobile computing device. The request indicates that the mobile computing device desires to receive the one or more enterprise sponsored mobile data services. The method continues at step 140 where the enterprise server and/or the mobile data service provider server process the request to determine the mobile computing device's eligibility. This may be done by executed the method of the FIGS. 6A and/or 6C. The method continues at step 142 where, when the request is granted, the enterprise server and/or the mobile data service provider server indicate that the mobile computing device is eligible.

The method of FIG. 6C begins at step 144 where the enterprise server and/or the mobile data service provider server determine whether the mobile computing device is associated with an authorized ticket (e.g., ticket to an event, access pass to an event, a badge for a conference, a frequent user card at a stored, etc.). As an example, the enterprise server and/or the mobile data service provider server verify the ticket by scanning the ticket and accessing the client and/or subscriber database(s) to determine that it is an authentic ticket. As another example, the enterprise server and/or the mobile data service provider server scans the ticket to extract authentication information. If the ticket is not authorized, the method continues at step 136 where the enterprise server and/or the mobile data service provider server indicate that the mobile computing device is not eligible.

If the ticket is authorized, the method continues at step 146 where the enterprise server and/or the mobile data service provider server determine whether the authorized ticket includes access to the sponsored mobile data service. For example, the enterprise server and/or the mobile data service provider server access the client and/or subscriber database(s) to determine status of eligibility for receiving the sponsored mobile data service. As another example, the enterprise server and/or the mobile data service provider server scans the ticket to extract eligibility information. If the ticket does not include access to the sponsored mobile data service, the method continues at step 136 where the enterprise server and/or the mobile data service provider server indicate that the mobile computing device is not eligible.

If the ticket includes access to the sponsored mobile data service, the method continues at step 148 where the enterprise server and/or the mobile data service provider server determine whether the event is active. For example, the enterprise server and/or the mobile data service provider server determine that a sporting event is currently taking place. As another example, the enterprise server and/or the mobile data service provider server determine that the mobile computing device is a registered guest and on the premises of the enterprise. If the event is not active, the method continues at step 136 where the enterprise server and/or the mobile data service provider server indicate that the mobile computing device is not eligible. If the event is active, the method continues at step 134 where the enterprise server and/or the mobile data service provider server indicate that the mobile computing device is eligible.

FIG. 7 is a logic diagram of an example of a method in furtherance of sponsoring mobile data services by registering the mobile computing device for the enterprise sponsored mobile data service. The method begins at step 150 where the enterprise server sends a notice message to the mobile data service provider server. The notice message indicates that the one or more enterprise sponsored mobile data services are to be available to the mobile computing device.

The method continues at step 152 where the mobile data service provider server authorizes the mobile computing device receiving the one or more enterprise sponsored mobile data services based on the mobile computing device data subscription and subscriber information of the mobile computing device. For example, the mobile data service provider server verifies that the mobile computing device is associated with a valid subscriber of the mobile data service provider and subscriber's mobile data service plan allows for receiving sponsored mobile data services. The method continues at step 154 where the at least one of the enterprise server and/or the mobile data service provider server sends an acknowledgement of authorization for receiving the one or more enterprise sponsored mobile data services to the mobile computing device.

FIG. 8 is a logic diagram of another example of a method in furtherance of sponsoring mobile data services by registering the mobile computing device for the enterprise sponsored mobile data service. The method begins at step 156 where the mobile computing device sends a request to mobile data service provider server for authorization to receive the one or more enterprise sponsored mobile data services. The method continues at step 158 where the mobile data service provider server sends, in response to receiving the request, an enterprise authorization request to enterprise server. The method continues at step 160 where the mobile data service provider server receives a favorable enterprise authorization response from the enterprise server. Further, in step 160, the mobile data service provider server sends, in response to the favorable enterprise authorization response, an acknowledgement of authorization for receiving the one or more enterprise sponsored mobile data services to the mobile computing device.

FIG. 9 is a logic diagram of another example of a method in furtherance of sponsoring mobile data services. The method begins at step 162 where the enterprise server and/or the mobile data service provider server determine that a related mobile computing device of the mobile computing device is within the enterprise geographic location. For example, a related mobile computing device is another mobile computing device owned by the same user of the mobile computing device. As another example, a related mobile computing device is a mobile computing device owned by another person (e.g., a family member, coworker) and the other person and the user are in a shared data service plan (e.g., family plan, work plan). Determining the location of the related mobile computing device is a similar process as determining the location of the mobile computing device.

When the user of the mobile computing device is eligible for the one or more enterprise sponsored mobile data services, the method continues at step 163 where the enterprise server and/or the mobile data service provider server provide the enterprise sponsored mobile data service(s) in accordance with the use parameters to the related mobile computing device. The method continues at step 164 where the mobile data service provider server adjusts billing rate of the related mobile computing device while receiving the enterprise sponsored mobile data service(s).

FIG. 10 is a logic diagram of another example of a method in furtherance of sponsoring mobile data services. The method begins at step 170 where the enterprise server and/or the mobile data service provider server determine whether the enterprise sponsored data services for the mobile computing device have been exhausted (e.g., time has expired, an event has ended, reached a data consumption threshold, eligibility expired, etc.). If yes, the method continues to step 172 where the enterprise server and/or the mobile data service provider server end the enterprise sponsored mobile data services for the mobile computing device.

If the enterprise sponsored mobile data services are not exhausted, the method continues at step 174 where the enterprise server and/or the mobile data service provider server determine whether the mobile computing device has left the enterprise geographic location. If not, the method loops back to step 170.

If the mobile computing device has left the enterprise geographic location, the method continues at step 176 where the enterprise server and/or the mobile data service provider server determine whether the mobile computing device is eligible to continue to receive the enterprise sponsored mobile data services. For example, elite members of the enterprise are eligible for extended location sponsored mobile data services while other members are not. As another example, a user that purchased a box seat ticket is eligible for extended location sponsored mobile data service while users that purchased general admission tickets are not.

If the mobile computing device is not eligible for the extended location sponsored mobile data services, the method continues at step 180 where the enterprise server and/or the mobile data service provider server suspends the enterprise sponsored mobile data service(s). The enterprise server and/or the mobile data service provider server resume providing of the enterprise sponsored mobile data service(s) when the mobile computing device has returned to the enterprise geographic location.

If the mobile computing device is not eligible for the extended location sponsored mobile data services, the method continues at step 178 where the enterprise server and/or the mobile data service provider server continue to provide the enterprise sponsored mobile data service(s). For example, the enterprise server and/or the mobile data service provider server continue to provide the enterprise sponsored mobile data service(s) while the mobile computing device is within a distance (e.g., 5 miles, 10 miles, etc.) of the enterprise geographic location. If the mobile computing device leaves this extended distance, the enterprise server and/or the mobile data service provider server suspends the enterprise sponsored mobile data service(s) for the mobile computing device.

As another example, the enterprise server and/or the mobile data service provider server continue to provide the enterprise sponsored mobile data service(s) to the mobile computing device regardless of the distance outside of the enterprise geographic location. As an extension of this example, the enterprise server and/or the mobile data service provider server hand off the providing of enterprise sponsored mobile data service to another enterprise service when the mobile computing device is proximal to the premises of another enterprise.

Figure 11:
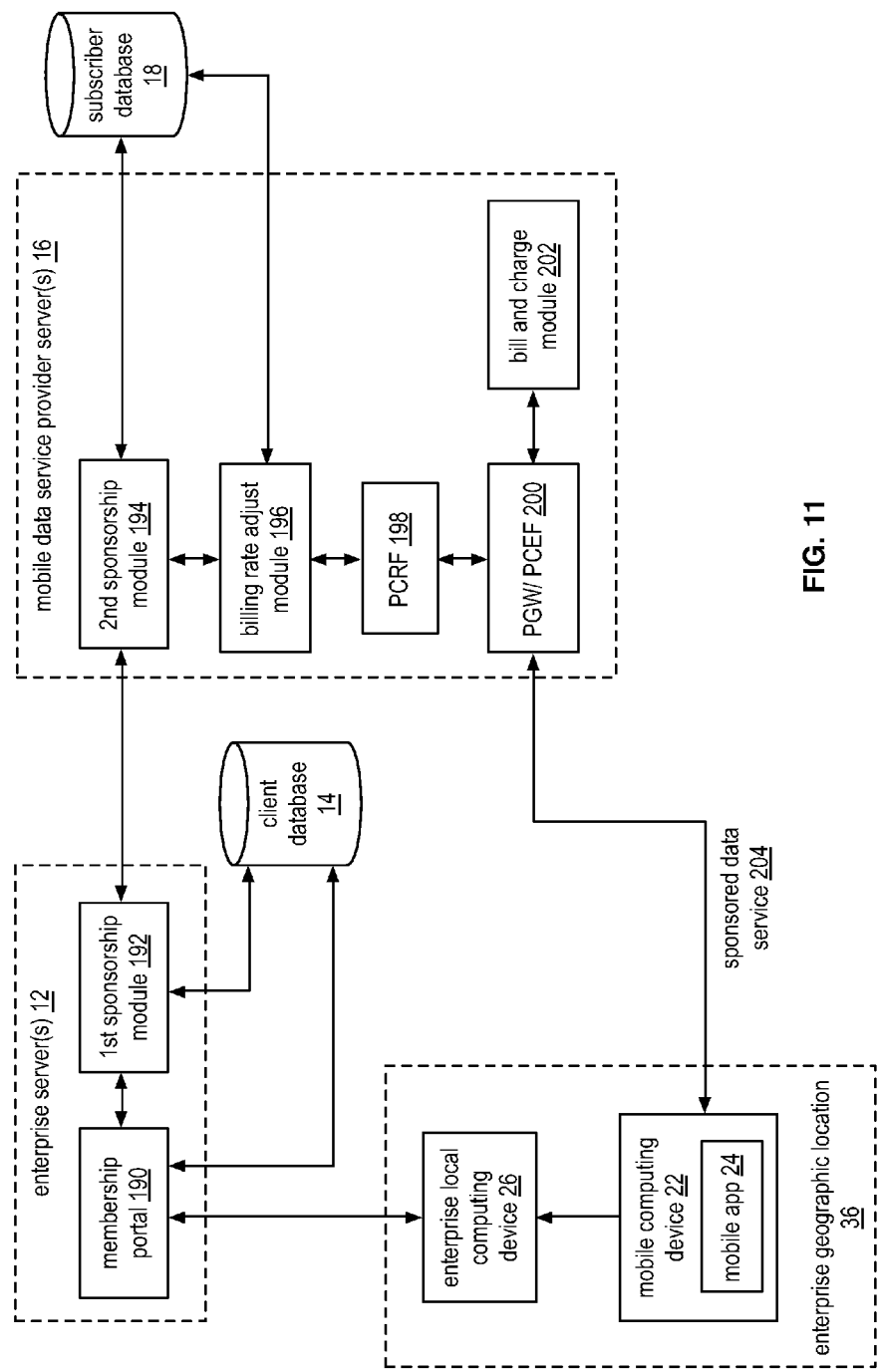
FIG. 11 is a schematic block diagram of an example of a communication system supporting sponsored mobile data services in accordance with the present invention.

FIG. 11 is a schematic block diagram of an example of a communication system supporting sponsored mobile data services. The system 10 includes the enterprise server(s) 12, the client database 14, the mobile data service provider server(s) 16, the subscriber database 18, the enterprise local computing device 26, and the mobile computing device 22. The enterprise server(s) 12 include a membership portal 190 and a $1^{st}$ sponsorship module 192. The mobile data service provider server(s) 16 include a $2^{nd}$ sponsorship module 194, a billing rate adjust module 196, a policy and changing rule function (PCRF) module 198, a packet data network gateway (PGW)/policy and changing execution function (PCEF) module 200, and a bill and changing module 202.

In an example of operation, it is assumed that the enterprise is a hotel and has an arrangement with the mobile data service provider regarding enterprise sponsored mobile data; the enterprise has equipment to track the location of the mobile computing device (e.g., Bluetooth beacon system); the user of the mobile computing device is enrolled in a membership program of the enterprise and has a status level allowing it to receive enterprise sponsored mobile data services 204; the mobile computing device has the mobile application 24 of the enterprise and/or the mobile data service provider that facilitates the mobile computing device receiving the enterprise sponsored mobile data service(s); and the user of the mobile computing device is registering two other guests that have related mobile computing devices.

The example of operation begins when the user of the mobile computing device signs into an enterprise account, which may be done via the mobile application 24, via another computing device, and/or via the enterprise local computing device. As part of signing in, the user of mobile computing device provides information regarding the mobile computing device (e.g., phone number, IP address, etc.) and provides similar information for the related mobile computing devices. The enterprise server sends an acknowledgement to the mobile computing device and the related mobile computing devices when the account information is verified.

The example continues when the mobile computing device 22 enters the enterprise geographic location, the enterprise server 12 determines that the mobile computing device is within the enterprise geographic location and sends a "welcoming" message to the mobile computing device and may further send the welcoming message to the related mobile computing devices. The welcoming message indicates the users of the mobile computing device and the related mobile computing devices are eligible for enterprise sponsored mobile data services.

The example continues with the enterprise server 12 utilizing the $1^{st}$ sponsorship module 192 to communicate to the $2^{nd}$ sponsorship module 194 of the mobile data service provider server of the mobile computing device and related mobile computing devices being eligible for enterprise sponsored mobile data services. The $2^{nd}$ sponsorship module 194 processes the request by accessing the subscriber database 18 to determine whether the mobile computing devices are valid subscribers of the mobile data service provider. If valid subscribers, the $2^{nd}$ sponsorship module 194 informs the billing rate adjust module 196 (e.g., zero-charging or reduced rate application function) of the enterprise sponsored mobile data services being provided to the mobile computing devices and sends an acknowledgement to the $1^{st}$ sponsorship module 192. The billing rate adjust module 196 communicates sponsored mobile data service information to the policy and changing rule function (PCRF) module 198, which creates a new charging record for each of the mobile computing devices regarding the enterprise sponsored mobile data service(s).

The enterprise server provides the acknowledgment to the mobile computing devices and informs them of the enterprise sponsored mobile data service(s) and the conditions thereof (e.g., free or reduced rate service, only valid while on premises, a data consumption amount, time limits, data content, etc.). The mobile computing devices accept the enterprise sponsored mobile data service(s) and can begin using the service(s).

As the mobile computing devices utilize the enterprise sponsored mobile data services, the packet data network gateway (PGW)/policy and changing execution function (PCEF) module 200 tracks the usage and compliance with the guidelines of use (e.g., data consumption, time frame, etc.). While the enterprise sponsored mobile data services are being used in accordance with the guidelines, the bill and changing module 202 applies the zero or reduced billing rate to the mobile computing devices.

When the enterprise sponsored mobile data service(s) has been exhausted, the packet data network gateway (PGW)/policy and changing execution function (PCEF) module 200 notifies the $1^{st}$ sponsorship module 192 that the mobile computing devices have exhausted the sponsored mobile data services. Upon receiving the notification, the enterprise server 12 informs the mobile computing devices that the enterprise sponsored mobile data service(s) are exhausted and that the sponsorship has ended.

Figure 12:
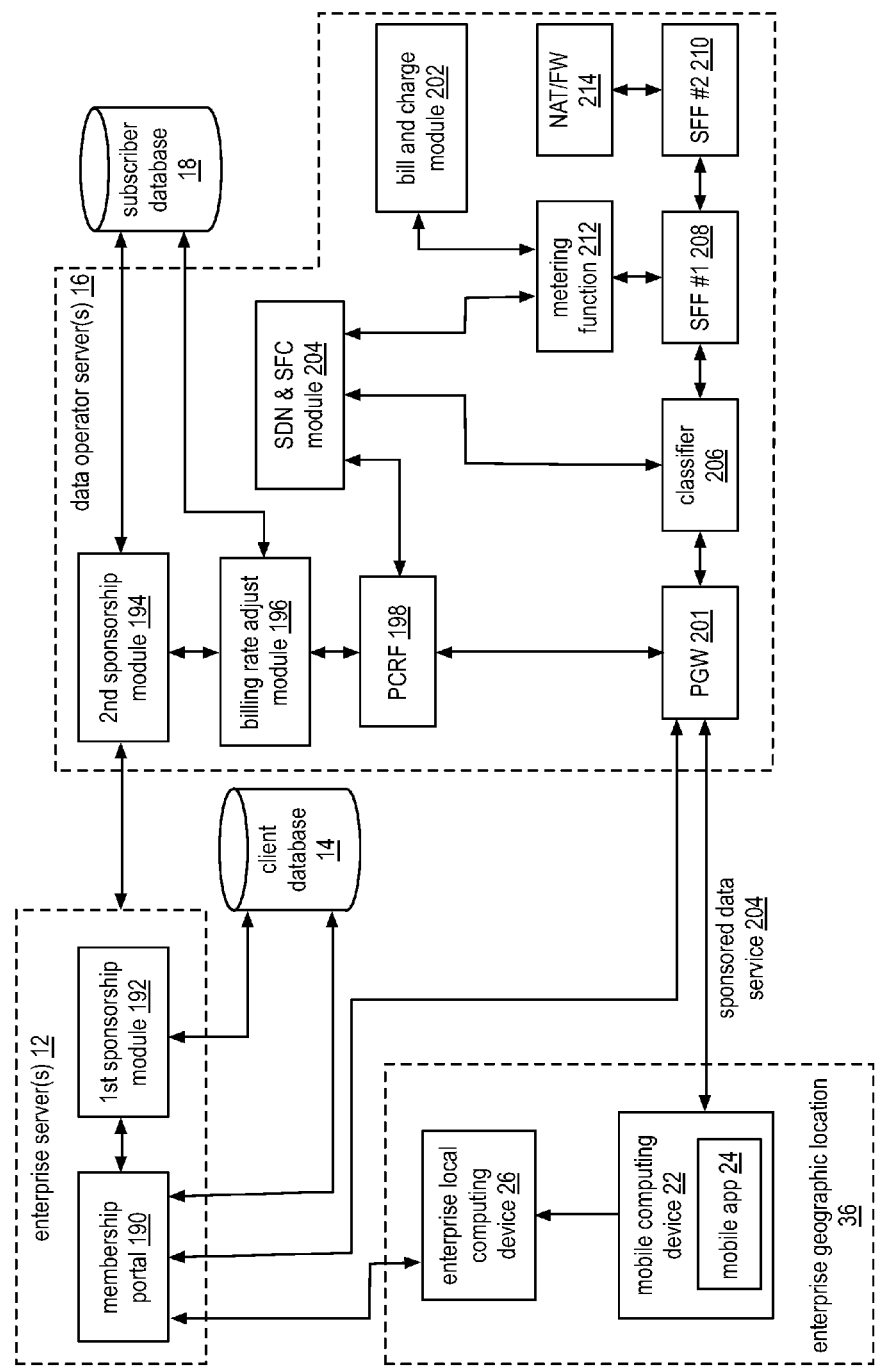
FIG. 12 is a schematic block diagram of another example of a communication system supporting sponsored mobile data services in accordance with the present invention.

FIG. 12 is a schematic block diagram of another example of a communication system supporting sponsored mobile data services. The system includes the enterprise server(s) 12, the client database 14, the mobile data service provider server(s) 16, the subscriber database 18, the enterprise local computing device 26, and the mobile computing device 22. The enterprise server(s) 12 include a membership portal 190 and a $1^{st}$ sponsorship module 192. The mobile data service provider server(s) 16 include a $2^{nd}$ sponsorship module 194, a billing rate adjust module 196, a policy and changing rule function (PCRF) module 198, a packet data network gateway (PGW) module 201, a bill and changing module 202, a software defined network (SDN) and service function chaining (SFC) module 204, a classifier module 206, a first service function forwarder (SFF) module 208, a second service function forwarder (SFF) module 210, a metering module 212, and a network address translation and firewall (NAT/FW) module 214. Note that the functionality of the packet data network gateway (PGW)/policy and changing execution function (PCEF) module 200 of FIG. 11 is split into the metering module 212 and the network address translation and firewall (NAT/FW) module 214 and function in accordance with the IETF SFC working group documents.

The classifier module 206 functions in accordance with the IETF SFC working group documents, which classifies flows that need to pass though with a specific chain of service functions and encapsulates the packets with appropriate packet headers. The software defined network (SDN) and service function chaining (SFC) module 204 includes part of the zero-rating application function. The software defined network (SDN) and service function chaining (SFC) module 204 interfaces to the PCRF module 198 and the classifier using the Sd interface defined in 3GPP specifications.

The embodiment of FIG. 12 is extended through SDN to provide Controlled Content to qualified subscribers. An example of Controller Content would include (but not limited to) video or audio services related to an exhibit at a museum, zoo, amusement park, or exhibition such as an auto show. The privileged content would be accessible to qualified subscribers who enter the sponsored Geo-Fence associated with an Event or Sponsor's Geo-Fence boundaries. In this scenario there is no change to the user authentication, policy and charging, and metering functions described in the previous scenarios.

In an example, the mobile data service provider (MO) provisions a set of links (URLs) associated with Sponsor's Controlled Content. Sponsors record include the Description of the Controlled Content (e.g., Audio description of an exhibit at the exhibition), Dates/Days and Times that the Controller Content would be available, and the Location (e.g., Geo-Fence for identifying presence at the Sponsor's location or more precisely a Geo-Fence identifying a specific exhibit at an exhibition). There will be a plurality of these records associated with multiple Sponsors or Events.

It is assumed in this scenario that the MO has provisioned an application on the subscriber's smartphone that provides the list (menu) of Controller Content and the specific Locations associated with the content. A qualified subscriber will be notified and presented with the opportunity to view the Controlled Content once the subscriber enters the Controlled Content's Geo-Fence.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for sponsoring mobile data services that is executed by one or more computing devices, the method comprises:
   determining that a mobile computing device is within an enterprise geographic location and is within the enterprise geographic location for engaging with an enterprise regarding an enterprise service, wherein the enterprise is associated with the enterprise geographic location;
   when the mobile computing device is within the enterprise geographic location:
      determining that a user of the mobile computing device is eligible for one or more enterprise sponsored mobile data services;
      when the user of the mobile computing device is eligible for the one or more enterprise sponsored mobile data services:
         determining use parameters for the one or more enterprise sponsored mobile data services based on one or more of: user profile data, type of sponsorship, type of sponsored mobile data service, and mobile computing device data subscription;
         registering the mobile computing device for the one or more enterprise sponsored mobile data services with at least one of an enterprise server and a mobile data service provider;
         receiving, by the mobile computing device, the one or more enterprise sponsored mobile data services in accordance with the use parameters; and
         adjusting, by the mobile data service provider, billing rate of the mobile computing device while receiving the one or more enterprise sponsored mobile data services.

2. The method of claim 1, wherein the determining that the mobile computing device is within the enterprise geographic location comprises:
   determining a geographic location of the mobile computing device based one or more of global positioning satellite information, Bluetooth beacon reception, registration with a wireless local area network of the enterprise, location data entry into the mobile computing device, and data entry into an enterprise local computer;
   obtaining boundary information of the enterprise geographic location;
   comparing the geographic location of the mobile computing device with the boundary information; and
   when the comparison is favorable, indicating that the mobile computing device is within the enterprise geographic location.

3. The method of claim 1, wherein the determining that the user of the mobile computing device is eligible for one or more enterprise sponsored mobile data services comprises one or more of:
   accessing user profile data;
   requesting, by the mobile computing device, the one or more enterprise sponsored mobile data services and, in response to the requesting, granting, by the at least one of an enterprise server and a mobile data service provider, the one or more enterprise sponsored mobile data services;
   verifying that the user of the mobile computing device has an authorized ticket to an event occurring within the enterprise geographic location and the authorized ticket includes the one or more enterprise sponsored mobile data services for a duration of the event; and
   determining that the user of the mobile computing device is eligible for one or more enterprise sponsored mobile data services as a default for being within the enterprise geographic location.

4. The method of claim 1 further comprises:
   the use parameters include one or more of:
      providing the one or more enterprise sponsored mobile data services only while the mobile computing device is within the enterprise geographic location,
      providing the one or more enterprise sponsored mobile data services for a specified time duration, and
      providing the one or more enterprise sponsored mobile data services while data consumption during the receiving of the one or more enterprise sponsored mobile data services by the mobile computing device remains below a data consumption threshold;
   the user profile data includes one or more of: the user of the mobile computing device being a registered guest of the enterprise, an enterprise award program to which the user of the mobile computing device has subscribed, a level of client, and the user of the mobile computing device being affiliated with an event occurring within the enterprise geographic location;
   the type of sponsorship includes one or more of: an event based sponsorship, a time based sponsorship, a location based sponsorship, a client reward based sponsorship, a data consumption based sponsorship; and
   the type of sponsored mobile data service includes one or more of: unique data content at no cost, reduced rate data service, and zero cost data services.

5. The method of claim 1, wherein the registering the mobile computing device for the one or more enterprise sponsored mobile data services comprises:
   sending, by the enterprise server, a notice message to the mobile data service provider server, wherein the notice message indicates that the one or more enterprise sponsored mobile data services are to be available to the mobile computing device;
   authorizing, by the mobile data service provider server, the mobile computing device receiving the one or more enterprise sponsored mobile data services based on the mobile computing device data subscription and subscriber information of the mobile computing device; and
   sending, by the at least one of the enterprise server and the mobile data service provider server, an acknowledgement of authorization for receiving the one or more enterprise sponsored mobile data services to the mobile computing device.

6. The method of claim 1, wherein the registering the mobile computing device for the one or more enterprise sponsored mobile data services comprises:

sending, by the mobile computing device, a request to mobile data service provider server for authorization to receive the one or more enterprise sponsored mobile data services;

sending, by the mobile data service provider server and in response to receiving the request, an enterprise authorization request to enterprise server;

receiving, by the mobile data service provider server, a favorable enterprise authorization response; and in response to the favorable enterprise authorization response, sending, by the mobile data service provider server, an acknowledgement of authorization for receiving the one or more enterprise sponsored mobile data services to the mobile computing device.

7. The method of claim 1, wherein the adjusting the billing rate comprises one of:
reducing the billing rate to zero; and
reducing the billing rate by a percentage of a non-sponsored billing rate.

8. The method of claim 1 further comprises:
determining that a related mobile computing device of the mobile computing device is within the enterprise geographic location;
when the user of the related mobile computing device is eligible for the one or more enterprise sponsored mobile data services:
providing the one or more enterprise sponsored mobile data services in accordance with the use parameters to the related mobile computing device; and
adjusting, by the mobile data service provider server, billing rate of the related mobile computing device while receiving the one or more enterprise sponsored mobile data services.

9. The method of claim 1 further comprises one or more of:
continue providing of the one or more enterprise sponsored mobile data services when the mobile computing device is no longer within the enterprise geographic location;
suspending providing of the one or more enterprise sponsored mobile data services when the mobile computing device is no longer within the enterprise geographic location; and
resuming the providing of the one or more enterprise sponsored mobile data services when the mobile computing device has returned to the enterprise geographic location.

10. The method of claim 1, wherein engaging with the enterprise regarding the enterprise service comprises one or more of:
shopping for goods at a store of a retail business enterprise;
receiving a service from a service business enterprise;
shopping for consumable goods at a store of a food service business; and
attending an event hosted by an event hosing business enterprise.

11. A sponsored data communication system comprises:
a first module that, when operable within a first computing device, causes the first computing device to:
determine that a mobile computing device is within an enterprise geographic location and is within the enterprise geographic location for engaging with an enterprise regarding an enterprise service, wherein the enterprise is associated with the enterprise geographic location;

a second module that, when operable within at least one of the first computing device and a second computing device, causes the at least one of the first and second computing devices to:
when the mobile computing device is within the enterprise geographic location:
determine that a user of the mobile computing device is eligible for one or more enterprise sponsored mobile data services;
when the user of the mobile computing device is eligible for the one or more enterprise sponsored mobile data services:
determine use parameters for the one or more enterprise sponsored mobile data services based on one or more of: user profile data, type of sponsorship, type of sponsored mobile data service, and mobile computing device data subscription; and
register the mobile computing device for the one or more enterprise sponsored mobile data services;
a third module that, when operable within the mobile computing device, causes the mobile computing device to:
receive the one or more enterprise sponsored mobile data services in accordance with the use parameters; and
a fourth module that, when operable within the at least one of the first and second computing devices, causes the at least one of the first and second computing devices to:
adjust billing rate of the mobile computing device while receiving the one or more enterprise sponsored mobile data services.

12. The sponsored data communication system of claim 11, wherein the first module, when operable within the first computing device, further causes the first computing device to determine that the mobile computing device is within the enterprise geographic location by:
determining a geographic location of the mobile computing device based one or more of global positioning satellite information, Bluetooth beacon reception, registration with a wireless local area network of the enterprise, location data entry into the mobile computing device, and data entry into an enterprise local computer;
obtaining boundary information of the enterprise geographic location;
comparing the geographic location of the mobile computing device with the boundary information; and
when the comparison is favorable, indicating that the mobile computing device is within the enterprise geographic location.

13. The sponsored data communication system of claim 11, wherein the second module, when operable within at least one of the first and second computing devices, further causes the at least one of the first and second computing devices to determine that the user of the mobile computing device is eligible for one or more enterprise sponsored mobile data services by one or more of:
accessing user profile data;
receiving, from the mobile computing device, a request for the one or more enterprise sponsored mobile data services and, in response to the request, granting the request for the one or more enterprise sponsored mobile data services;

verifying that the user of the mobile computing device has an authorized ticket to an event occurring within the enterprise geographic location and the authorized ticket includes the one or more enterprise sponsored mobile data services for a duration of the event; and determining that the user of the mobile computing device is eligible for one or more enterprise sponsored mobile data services as a default for being within the enterprise geographic location.

14. The sponsored data communication system of claim 11 further comprises:
the use parameters include one or more of:
providing the one or more enterprise sponsored mobile data services only while the mobile computing device is within the enterprise geographic location,
providing the one or more enterprise sponsored mobile data services for a specified time duration, and
providing the one or more enterprise sponsored mobile data services while data consumption during the receiving of the one or more enterprise sponsored mobile data services by the mobile computing device remains below a data consumption threshold;
the user profile data includes one or more of: the user of the mobile computing device being a registered guest of the enterprise, an enterprise award program to which the user of the mobile computing device has subscribed, a level of client, and the user of the mobile computing device being affiliated with an event occurring within the enterprise geographic location;
the type of sponsorship includes one or more of: an event based sponsorship, a time based sponsorship, a location based sponsorship, a client reward based sponsorship, a data consumption based sponsorship; and
the type of sponsored mobile data service includes one or more of: unique data content at no cost, reduced rate data service, and zero cost data services.

15. The sponsored data communication system of claim 11, wherein the second module, when operable within at least one of the first and second computing devices, further causes the at least one of the first and second computing devices to register the mobile computing device for the one or more enterprise sponsored mobile data services by:
sending a notice message to indicate that the one or more enterprise sponsored mobile data services are to be available to the mobile computing device;
authorizing the mobile computing device receiving the one or more enterprise sponsored mobile data services based on the mobile computing device data subscription and subscriber information of the mobile computing device; and
sending an acknowledgement of authorization for receiving the one or more enterprise sponsored mobile data services to the mobile computing device.

16. The sponsored data communication system of claim 11, wherein the second module, when operable within at least one of the first and second computing devices, further causes the at least one of the first and second computing devices to register the mobile computing device for the one or more enterprise sponsored mobile data services by:
receiving, from the mobile computing device, a request for authorization to receive the one or more enterprise sponsored mobile data services;
sending, in response to receiving the request, an enterprise authorization request;
receiving a favorable enterprise authorization response; and in response to the favorable enterprise authorization response, sending an acknowledgement of authorization for receiving the one or more enterprise sponsored mobile data services to the mobile computing device.

17. The sponsored data communication system of claim 11, wherein the fourth module that, when operable within the at least one of the first and second computing devices, causes the at least one of the first and second computing devices to adjust the billing rate by one of:
reducing the billing rate to zero; and
reducing the billing rate by a percentage of a non-sponsored billing rate.

18. The sponsored data communication system of claim 11 further comprises:
the first module that, when operable within the first computing device, further causes the first computing device to:
determine that a related mobile computing device of the mobile computing device is within the enterprise geographic location;
the second module that, when operable within the at least one of the first and second computing devices, further causes the at least one of the first and second computing devices to:
when the user of the related mobile computing device is eligible for the one or more enterprise sponsored mobile data services, provide the one or more enterprise sponsored mobile data services in accordance with the use parameters to the related mobile computing device; and
the fourth module that, when operable within the at least one of the first and second computing devices, further causes the at least one of the first and second computing devices to:
adjust billing rate of the related mobile computing device while receiving the one or more enterprise sponsored mobile data services.

19. The sponsored data communication system of claim 11 further comprises:
a fifth module that, when operable within the at least one of the first and second computing devices, causes the at least one of the first and second computing devices to perform at least one of:
continue providing of the one or more enterprise sponsored mobile data services when the mobile computing device is no longer within the enterprise geographic location;
suspend providing of the one or more enterprise sponsored mobile data services when the mobile computing device is no longer within the enterprise geographic location; and
resume the providing of the one or more enterprise sponsored mobile data services when the mobile computing device has returned to the enterprise geographic location.

20. The sponsored data communication system of claim 11, wherein the first module that, when operable within a first computing device, further causes the first computing device to engage with the enterprise regarding the enterprise service by one or more of further comprises:
shopping for goods at a store of a retail business enterprise;
receiving a service from a service business enterprise;
shopping for consumable goods at a store of a food service business; and attending an event hosted by an event hosing business enterprise.

\* \* \* \* \*